Patented Nov. 14, 1950

2,530,300

UNITED STATES PATENT OFFICE 2,530,300

SEPARATION OF NORMAL PARAFFINS

Alfred E. Hirschler, Drexel Hill, Pa., assignor to Sun Oil Company, Philadelphia, Pa., a corporation of New Jersey No Drawing. Application June 11, 1948, Serial No. 32,532

7 Claims. (Cl. 260—676)

This invention relates to the separation of normal paraffin hydrocarbons from each other by selective adsorption employing activated carbon as the adsorbent.

The invention is especially adapted for purifying a lower molecular weight normal paraffin hydrocarbon from a starting mixture composed of a major amount of such lower molecular weight paraffin together with a minor amount of one or more higher molecular weight normal paraffin hydrocarbons. For example, the starting mixture may contain 80%, 90%, 95% or the like of the desired lower molecular weight paraffin together with one or more other normal paraffins of higher molecular weight, and the product resulting from treatment according to the present invention will comprise the lower molecular weight paraffin in a move nearly pure state.

I have discovered that when a liquid mixture of normal paraffin hydrocarbons is treated with activated carbon, the higher molecular weight paraffin or paraffins in the mixture will be selectively adsorbed in preference to the lower molecular weight paraffin. This is true regardless of what the particular normal paraffins may be of which the starting mixture is composed. Any mixture of normal paraffins may thus be separated by treating the mixture in liquid phase with activated carbon to selectively remove the higher molecular weight normal paraffin.

The process according to the invention preferably is carried out by filtering a liquid mixture of the normal paraffin hydrocarbons through a body of activated carbon to selectively adsorb the higher molecular weight component and separating from the adsorbent one or more filtrate fractions containing the lower molecular weight component in more nearly pure state. Preferably a large proportion of activated carbon is used relative to the amount of hydrocarbon material to be treated. If desired, the higher molecular weight component may also be obtained in more concentrated form than in the charge by displacing the adsorbate from the carbon by means of a suitable desorbing agent. As the desorbing agent, it is preferred to use a material which is more strongly adsorbable by activated carbon than the adsorbate. Examples of such desorbing agents are benzene, toluene, xylene, phenol or other aryl compounds, and olefinic hydrocarbons. A still higher molecular weight paraffin may also be employed. The efflux of filtrate from the body of adsorbent may be collected in a plurality of separate fractions in order to segregate the portion or portions having the desired purity.

The following examples, in which percentages are by volume, illustrate the invention more specifically:

Example I

A column having an internal diameter of about ½ inch and a height of 3 feet was packed with 50 grams of 60–90 mesh activated carbon. The column was provided with a water jacket through which water was continuously circulated at a temperature of about 45–50° F. to absorb heat generated due to wetting of the adsorbent. Forty-nine milliliters of a starting mixture consisting of 90% n-heptane and 10% hexadecane was percolated down through the column. After all of the charge had passed into the adsorbent, it was followed by benzene to displace the paraffin hydrocarbons from the column. It was found that the first 77% fraction of the filtrate was 100% pure n-heptane.

Example II

Forty-nine milliliters of a mixture consisting of 90% n-octane and 10% n-decane was treated with 50 grams of activated carbon in the same manner as described in the previous example. A plurality of filtrate cuts were taken and were analyzed to determine the n-octane content. Results were as follows:

| Cut No. | Fraction of Charge | Content of n-octane |
|---|---|---|
| | Per cent | Per cent |
| 1 | 0–2 | 98 |
| 2 | 2–4 | 97 |
| 3 | 4–8 | 96 |
| 4 | 8–16 | 95 |
| 5 | 16–25 | 94 |
| 6 | 25–32 | 93 |
| 7 | 32–40 | 91.5 |

Example III

One hundred milliliters of a mixture consisting of 95% n-heptane and 5% n-octane was treated with 125 grams of activated carbon in a column about 4 ft. high. The column was provided with a water jacket through which water at 60–65° F. was continuously circulated. After all the charge had passed into the adsorbent, it was followed by benzene to displace the paraffin hydrocarbons. A plurality of filtrate cuts were taken and were analyzed to determine the n-heptane content. The results were as follows:

| Cut No. | Fraction of Charge | Content of n-heptane |
|---|---|---|
| | Per cent | Per cent |
| 1 | 0–1.9 | 98.8 |
| 2 | 1.9–3.8 | 98.5 |
| 3 | 3.8–8.1 | 97.6 |
| 4 | 8.1–10.2 | 97.3 |
| 5 | 10.2–21.9 | 96.7 |

Higher purity than the above could have been obtained by retreating the filtrate with fresh carbon.

In practicing the invention it generally will be desirable to reactivate the adsorbent after it has been used in order that it may be used again. This may be done by blowing the adsorbent with hot inert gas or air to drive off the adsorbed hydrocarbons or to drive off the desorbing agent if one has been used. Regeneration may also be effected by washing the carbon with a saturate hydrocarbon liquid which is lower boiling than the charge hydrocarbons. The reactivated adsorbent may then be re-used for further purification of normal paraffins.

The temperature at which the adsorption operation is carried out may affect the efficiency of the separation and it generally will be the case that the adsorbent will have a poorer adsorption capacity at elevated temperature. The operation therefore is preferably conducted at room temperature or below to insure a better separation. This generally will necessitate the provision of some means for removing any heat generated due to wetting of the adsorbent as, for instance, by providing means for circulating a cooling medium around the adsorbent column or through cooling coils located within the adsorbent bed.

It will be understood that the above examples are merely illustrative and that the invention is applicable to the separation of any mixture of two or more normal paraffins. As previously stated, the invention is especially useful for purifying a normal paraffin from a feed mixture which already contains the desired paraffin in more or less concentrated form, for example, in a concentration exceeding 80%, say 90%, 95% or the like, together with one or more other normal paraffins.

This application is a continuation-in-part of my co-pending application Serial No. 672,683, filed May 27, 1946, now abandoned.

Having described my invention, what I claim and desire to protect by Letters Patent is:

1. Method of separating a higher molecular weight normal paraffin hydrocarbon from a lower molecular weight normal paraffin hydrocarbon which comprises introducing a non-aromatic liquid mixture composed essentially of such hydrocarbons into a body of activated carbon, thereby selectively adsorbing the higher molecular weight paraffin, and separating from the adsorbent a filtrate fraction which contains only a portion of the total hydrocarbons introduced, thereby obtaining a product containing the lower molecular weight paraffin in more nearly pure state.

2. Method according to claim 1 wherein the starting mixture is composed essentially of a major amount of the lower molecular weight paraffin and a minor amount of the higher molecular weight paraffin.

3. Method according to claim 1 wherein the starting mixture contains more than 80% of the lower molecular weight paraffin.

4. Method for purifying a normal paraffin hydrocarbon from a non-aromatic liquid mixture composed essentially of a major amount of said normal paraffin hydrocarbon and a minor amount of a higher molecular weight normal paraffin hydrocarbon which comprises filtering the mixture in liquid phase through a body of activated carbon, thereby selectively adsorbing said higher molecular weight paraffin, and separating from the adsorbent a filtrate fraction containing the desired normal paraffin in relatively pure state.

5. Method according to claim 4 wherein the said normal paraffins are adjacent homologues.

6. Method according to claim 1 wherein the said normal paraffins are adjacent homologues.

7. Method of obtaining a purified normal paraffin hydrocarbon from a non-aromatic liquid mixture composed of at least 80% of the desired normal paraffin together with its next higher homologue essentially as the impurity which comprises filtering the mixture in liquid phase through a body of activated carbon, thereby selectively adsorbing said next higher homologue, and separating from the adsorbent a filtrate fraction containing the desired normal paraffin in relatively pure state.

ALFRED E. HIRSCHLER.

REFERENCES CITED

The following references are of record in the file of this patent:

UNITED STATES PATENTS

| Number | Name | Date |
|---|---|---|
| 1,875,199 | Parkman | Aug. 30, 1932 |
| 2,449,402 | Lipkin et al. | Sept. 14, 1948 |

OTHER REFERENCES

Mair et al., The Oil and Gas Journal, Sept. 19, 1935, pages 29, 30 and 32.

Turner, Petroleum Refiner, vol. 22, No. 5, pages 140 to 144 (1943).